United States Patent
An

(10) Patent No.: US 6,234,042 B1
(45) Date of Patent: May 22, 2001

(54) ANGLE-ADJUSTABLE BICYCLE HANDLE ASSEMBLY

(76) Inventor: Sang-Kil An, 107 Nadong, Uam villa, 265-56, Panghak-dong, Tobong-gu, Seoul (KR)

(*) Notice: Subject to any disclaimer, the term of this patent is extended or adjusted under 35 U.S.C. 154(b) by 0 days.

(21) Appl. No.: 09/263,107

(22) Filed: Mar. 5, 1999

(51) Int. Cl.$^7$ .................................................. B62K 21/16
(52) U.S. Cl. ........................................ 74/551.5; 74/551.3
(58) Field of Search ............................. 74/551.5, 551.4, 74/551.3, 551.6, 551.7

(56) References Cited

U.S. PATENT DOCUMENTS

| | | | | |
|---|---|---|---|---|
| 581,255 | * | 4/1897 | Green .................................... | 74/551.5 |
| 588,242 | * | 8/1897 | Rexroth ................................ | 74/551.5 |
| 602,600 | * | 4/1898 | Green .................................... | 74/551.4 |
| 635,689 | * | 10/1899 | King et al. ........................... | 74/551.5 |
| 698,137 | * | 4/1902 | Porter ................................... | 74/551.5 |
| 4,384,497 | * | 5/1983 | Gatsos .................................. | 74/551.4 |
| 4,682,509 | * | 7/1987 | Takamiya et al. ................... | 74/551.4 |

* cited by examiner

Primary Examiner—Mary Ann Green
(74) Attorney, Agent, or Firm—Liniak, Berenato, Longacre & White, LLC

(57) ABSTRACT

An angle-adjustable bicycle handle assembly which has no position change of tooth portions when adjusting the position of a bicycle handle and provides a stabilized assembly structure and an improved appearance by adopting a cover member. A lever including a cam to which the rear end of a tightening bar is eccentrically connected; and a casing, including a hollow cylindrical body, a receiving portion which is formed at the front of the hollow cylindrical body, at an opened front end of which a movable cover is disposed, and in opened both sides of which bosses are oppposedly disposed, a fixed tooth which is formed at the inside of the receiving portion, being apart from the hollow inside of the cylindrical body and being in contact with the bosses, a blocking portion for blocking the rear end of the cylindrical body, an operational cam area, having opened three sides from the outside of the blocking portion, for allowing the cam to be eccentrically move, and guide holes for guiding the rear end of the tightening bar into the inside of the operational cam area. Accordingly, when performing a locking or releasing operation, the apparatus provides an improved cam structure having no change of position of the tooth portions.

14 Claims, 7 Drawing Sheets

ANGLE-ADJUSTABLE BICYCLE HANDLE ASSEMBLY

BACKGROUND OF THE INVENTION

The present invention relates to an angle-adjustable bicycle handle assembly which can adjust a down angle of a bicycle handle.

Generally, a common bicycle is provided with two wheels, pedals for transmitting propulsive force to the wheels, a chain connected between one wheel and the pedal, a frame having a predetermined shape for rotatably supporting the wheels, a saddle installed on the frame, and a handle.

There have been known various types of handle structures, such as a handle structure for transmitting a treading force of a rider to the wheels at maximum by directing handle grips further downwards, as well as a horizontal handle structure to which the hands of a rider sat on the saddle reach within a short distance.

The type of a handle having either a horizontal structure or a curved structure depends on a user's use. The horizontal handle structure is not suitable for cycle racing or long-distance traveling, and also the curved handle structure is not appropriate to short-distance traveling such as conveying loads, etc. Particularly, a fixed riding posture may lead to muscular problems in waist, shoulder, and the like.

Recently, there has now spreaded a home bicycle having a propulsive structure and a handle structure as bicycle race. However, a manufactured handle is in a single fashion of either a horizontal type or a curved type. In case of a curved handle, it is not easy for housewives or beginners to ride freely. A fixed horizontal handle is not popular with users due to an unstabilized riding posture. To secure a stabilized posture in this structure, it is possible to adjust the height of a saddle, but not possible for users to bend or stretch their back so as to be suitable to their height.

The above problem can be easily solved if a single handle structure may be changed into a horizontal shape or a curved shape according to the user's height.

Japanese patent laid-open application No. Sho 58-209674 discloses an apparatus for adjusting an angle of a bicycle handle, in which two handlebars are divided into left and right handles at the top end of a steering shaft to adjust an up and down angle. The left and right handles could be adjusted upwards and downwards at the same angle since they are engaged with tooth portions.

In order to perform temporary locking after an up and down angle is adjusted, a protruding tooth is formed at the front end of the tooth portion, and a cover structure which is removably dispositioned at the front of the protruding tooth is provided.

Therefore, a tightening bar which is connected to the cover tooth passes through the end of the tooth, and then a cam is rotated by a predetermined assembly, thereby engaging with or releasing from the cover tooth.

A conventional locking structure with a pin-shaped cam forms a control panel which is connected to the tightening bar backward the bosses of the tooth, and interposes a rod-shaped cam connected to a lever between the control panel and a tightening bar. This is a structure that both ends of the cam are disposed between the tightening bar, and does provide no means for preventing eccentricity of the cam. Accordingly, this structure has a frequent breakdown and a drawback that it requires a considerable rotatable force when performing a locking or releasing operation with respect to an angled surface of the cam, even though smooth movement with regard to a curved surface thereof is provided, thereby entirely providing no smooth locking and releasing manipulation.

Also, in order to solve the above problem, Korean Utility Model Registration No. 91480 (Utility Model Publication No. 95-5336), which was registered by the same applicant, discloses a cam tightening structure, in which a tightening bar is pivotally installed at a hinged cam axle which is formed at the rear end of the tightening bar, and a control panel having a hooker is movably provided at the hinged cam axle.

However, since the control panel, being a moving means, is further extended to the rear end of the casing, there is inconvenience in use or appearance. Also, a tightening interval according to the movement of the cam depends a limited outer circumferential surface of the cam in Japanese patent laid-open application No. Sho 58-209674 and Korean Utility Model Registration No. 91480. Therefore, there are defects that a thickness of the cam should be increased so as to elongate a linear movement distance, and corresponding tooth portions should be moved together when locking or releasing the cam axle since the cam axle has no support part, by which disengagement between tooth portions occurs frequently and the left and right handles are not supported firmly.

SUMMARY OF THE INVENTION

To solve above problems, it is an object of the present invention to provide an angle-adjustable bicycle handle assembly without changing a position of tooth portions when performing a locking or releasing manipulation.

It is another object of the present invention to provide a cover structure of a bicycle which covers a conventional exposed tightening bar or a movable cover, including a predetermined support structure at the rear end of which a lever is freely and eccentrically moved.

To accomplish the above object of the present invention, there is provided an angle-adjustable bicycle handle assembly comprising:

a lever including a cam to which the rear end of a tightening bar is eccentrically connected; and a casing, including a hollow cylindrical body;

a receiving portion which is formed at the front of the hollow cylindrical body, at an opened front end of which a movable cover is disposed, and in opened both sides of which bosses are oppsedly disposed;

a fixed tooth, formed at the inside of the receiving portion, being apart from the hollow inside of the cylindrical body and being in contact with the bosses;

a blocking portion for blocking the rear end of the cylindrical body;

an operational cam area, having opened three sides from the outside of the blocking portion, for allowing the cam to be eccentrically moved; and guide holes for guiding the rear end of the tightening bar into the inside of the operational cam area.

BRIEF DESCRIPTION OF THE DRAWINGS

The preferred embodiments are described with reference to the drawings wherein:

FIGS. 3A and 3B are sectional views of an angle-adjustable bicycle handle assembly according to the present invention. in which FIG. 3A shows a locking status thereof and FIG. 3B shows a release status thereof;

FIGS. 4A and 4B are perspective views of an angle-adjustable bicycle handle assembly according to the present invention, in which FIG. 4A shows a locking status thereof and FIG. 4B shows a release status thereof.

DETAILED DESCRIPTION OF THE PREFERRED EMBODIMENT

A preferred embodiment of the present invention will be described in detail with reference to the accompanying drawings.

Figure 1:
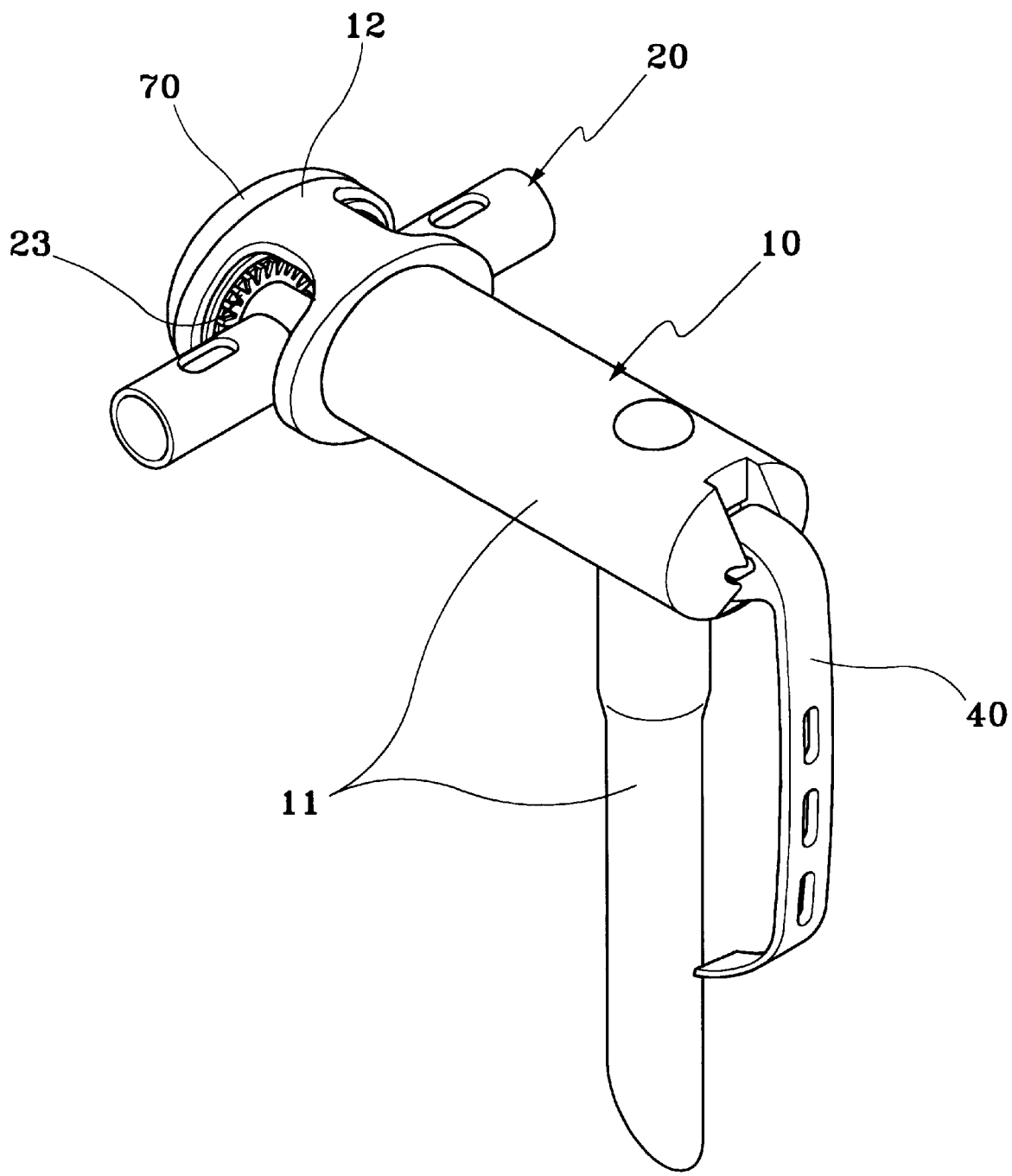
FIG. 1 is a perspective view showing an angle-adjustable bicycle handle assembly according to the present invention.
Figure 2:
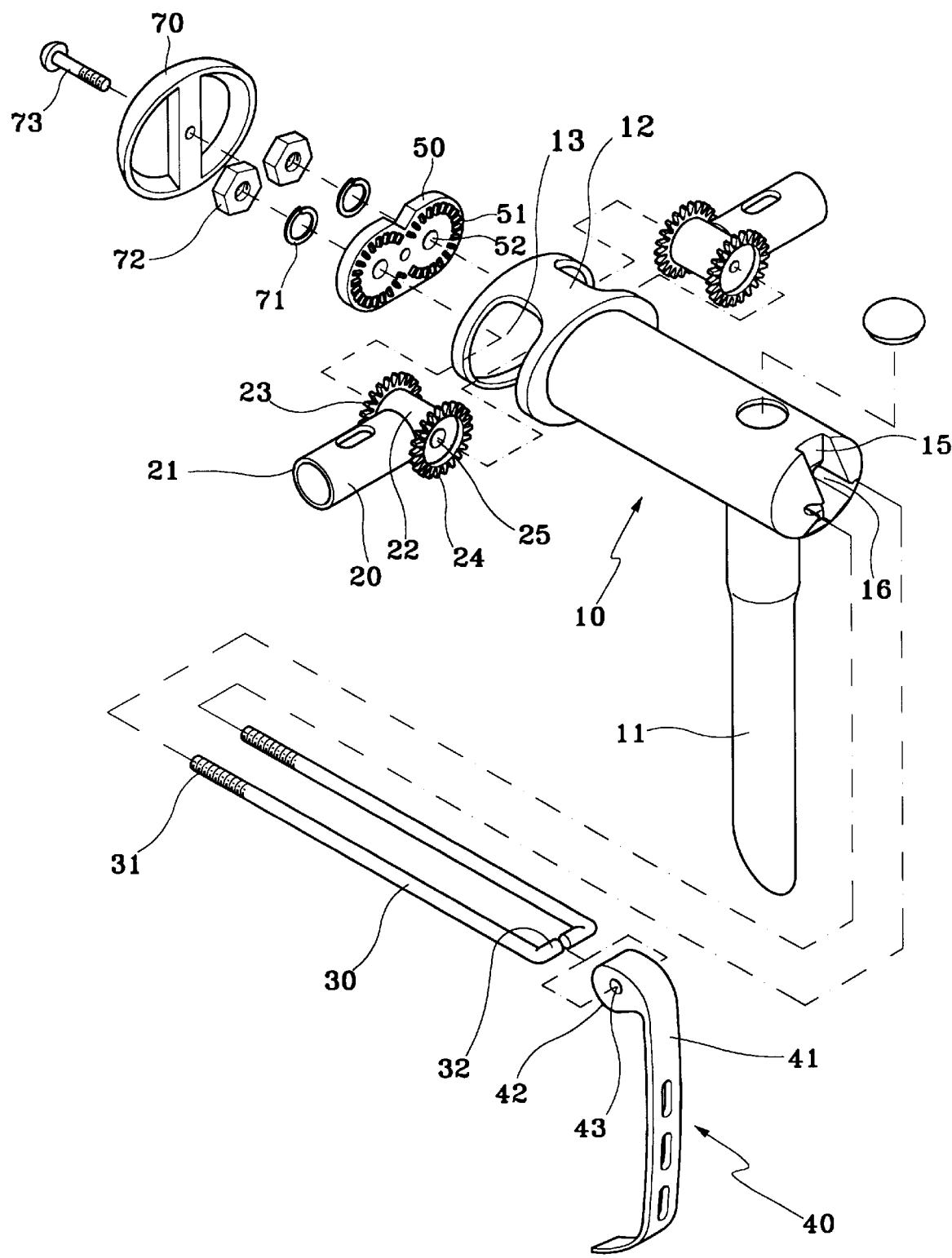
FIG. 2 is an exploded view showing an angle-adjustable bicycle handle assembly according to the present invention.

FIG. 1 is a perspective view showing an angle-adjustable bicycle handle assembly according to the present invention, and FIG. 2 is an exploded view showing the angle-adjustable bicycle handle assembly. As shown in FIGS. 1 and 2, the bicycle handle assembly comprises a casing 10, left and right bosses 20, a plurality of tightening bars 30, a lever 40, movable cover 50 and handlebars 60.

As shown in FIG. 2, the casing 10 has a hollow cylindrical body, at the lower portion of which a steering shaft connecting part 11 is formed, and at the front end of which a head portion 12 is disposed. At the inside of the head portion 12 formed is a receiving portion 13 of which the front and both sides are opened. At the inside of a rear end of the receiving portion 13, disposed is an eight-shaped fixed tooth 14 in which a tubular hole 18 is formed.

The rear end of the casing 10 is blocked by a blocking portion 17 on which a plurality of tubular orifices (which communicate with guide holes to be described hereinafter as holes through which the tightening bars pass) are formed. At the exterior of the blocking portion 17 a three-side-opened operational cam area 15 is formed. At both sides of the operational cam area 15 formed are guide holes 16 extended opposedly in communication with the inside of the blocking portion 17.

Figure 4A:
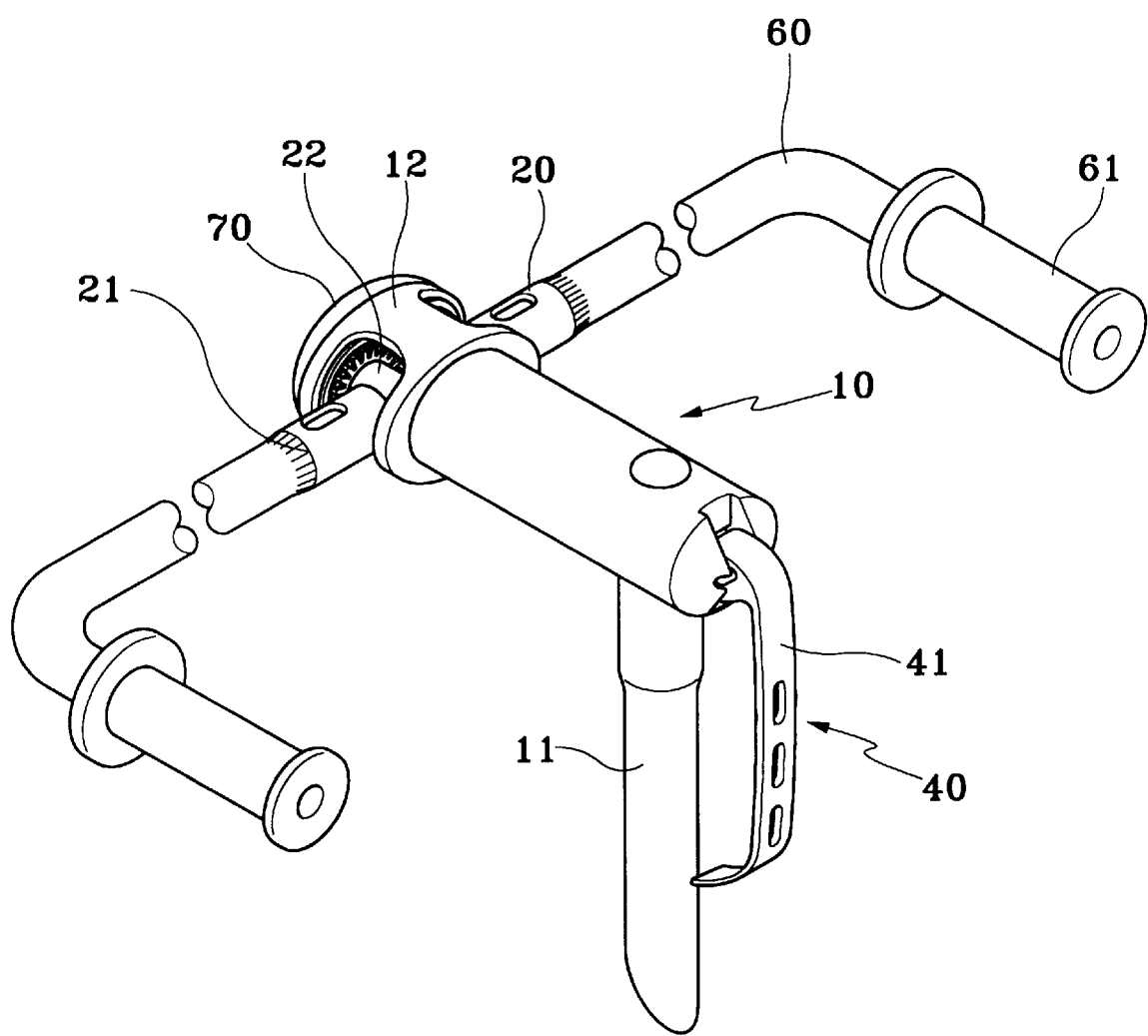

As shown in FIG. 4A, the bosses 20 comprise connection portions 21 which are connected with handlebars 60 extending from grips 61 and heads 22. At the both sides of the head 22 formed are gears 23 and 24. Each of the heads 22 includes a tubular orifice 25 therethrough. and is inserted into the receiving portion 13 of the casing 10 to engage with the gears 23 and 24 at the left and right thereof.

Figure 3A:
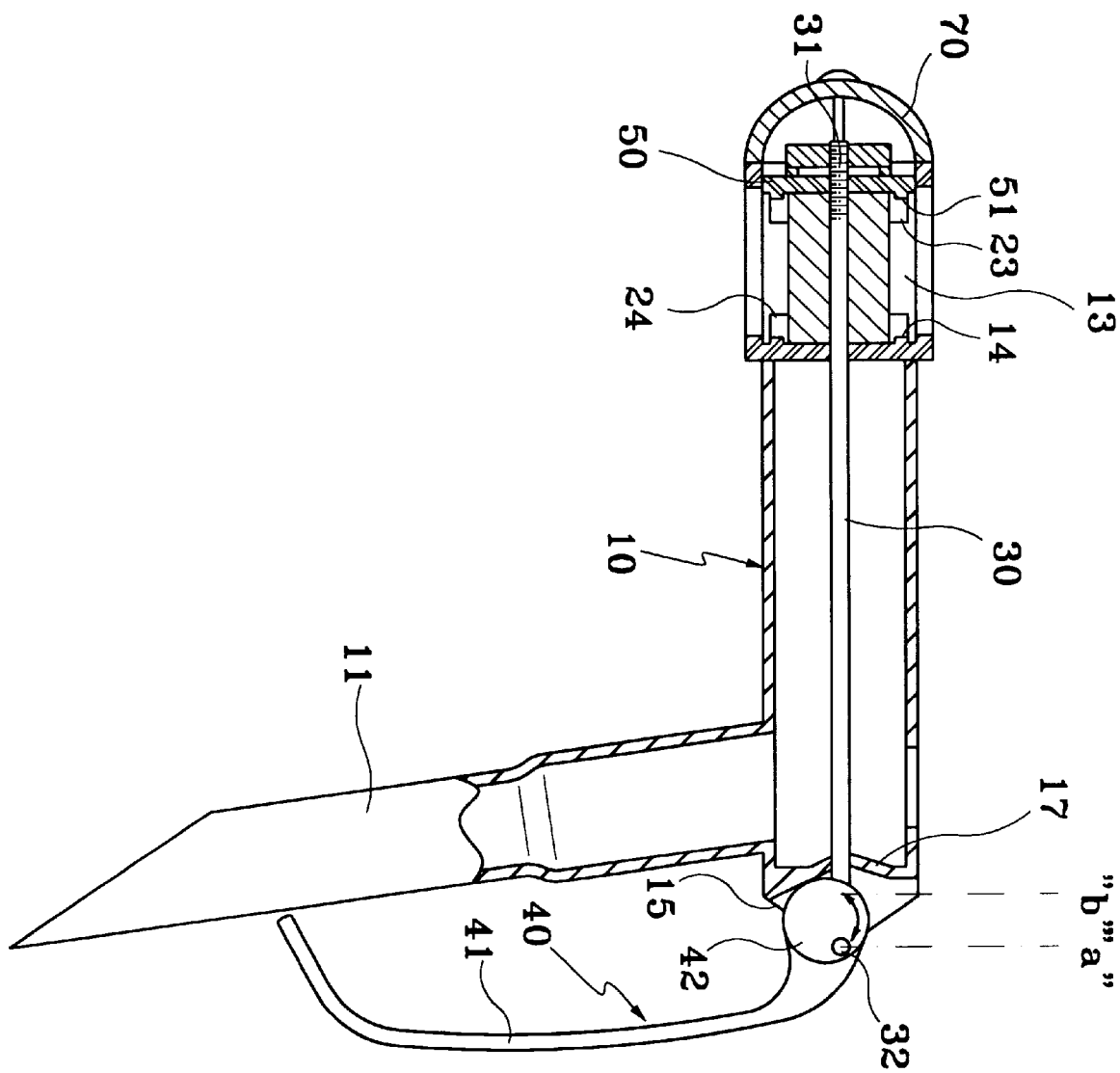
Figure 3B:
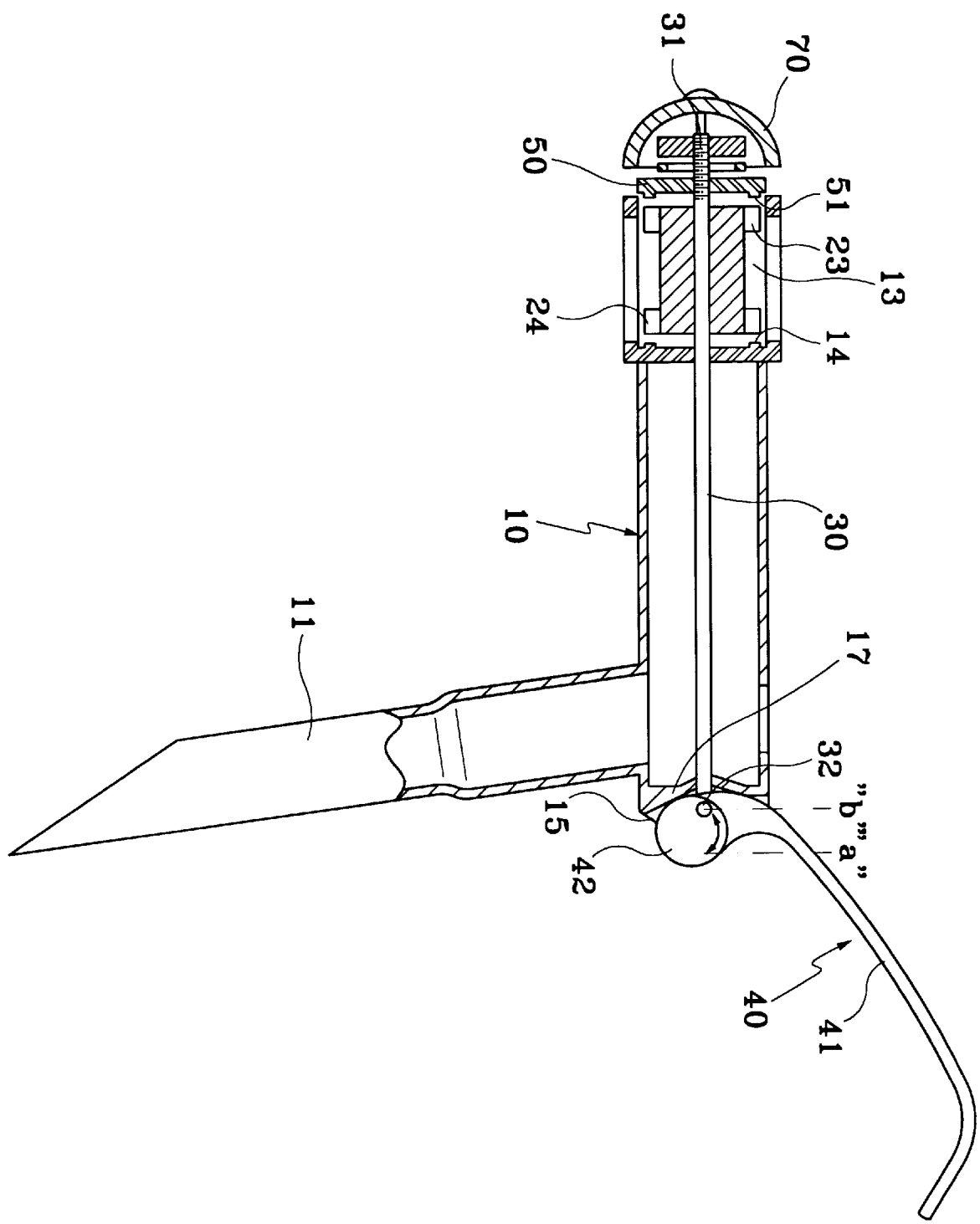

As shown in FIGS. 2, 3A and 3B, each of tightening bars 30 includes a helical portion 31 at the front end thereof and an axle part 32 which is bent at a predetermined angle. The two tightening bars 30 pass through the blocking portion 17, fixed tooth 14, tubular orifice 25 of the bosses 20 through-holes 52 of the movable cover 50, and then the helical portions 31 are fitted with a washer 71 and a nut 72. At this time, the rear of the tightening bar 30 is disposed movably through the guide hole 16, with being connected to a cam 42.

As shown in FIGS. 2, 3A and 3B, the cam 42 of the lever 40 is positioned at the operational cam area 15 of the rear end of the casing 10 and at the same time the axle part 32 of the tightening bar 30 is connected to an eccentric hole 43. The lever 40 is extended from the cam 42 having the eccentric hole 43.

As shown in FIG. 2, the movable cover 50 includes an eight-shaped pressure tooth 51 which is pressed to the front of the head portion 12 of the casing 10, in which a plurality of throughholes 52 are formed.

The head portion 12 of the casing 10 is engaged with the left and right bosses 20, movable cover 50 and the front end of the tightening bar 30 with the nut 72, and then covered with a front cover member 70. That is, a long bolt 73 passing through the cover member 70 is fixed at the center of the fixed tooth 14 formed between the receiving portion 13 and the hollow portion of the casing 10 after piercing the center of the movable cover 50. At this time, the movable cover 50 is not fixed with the long bolt 73.

Figure 4B:
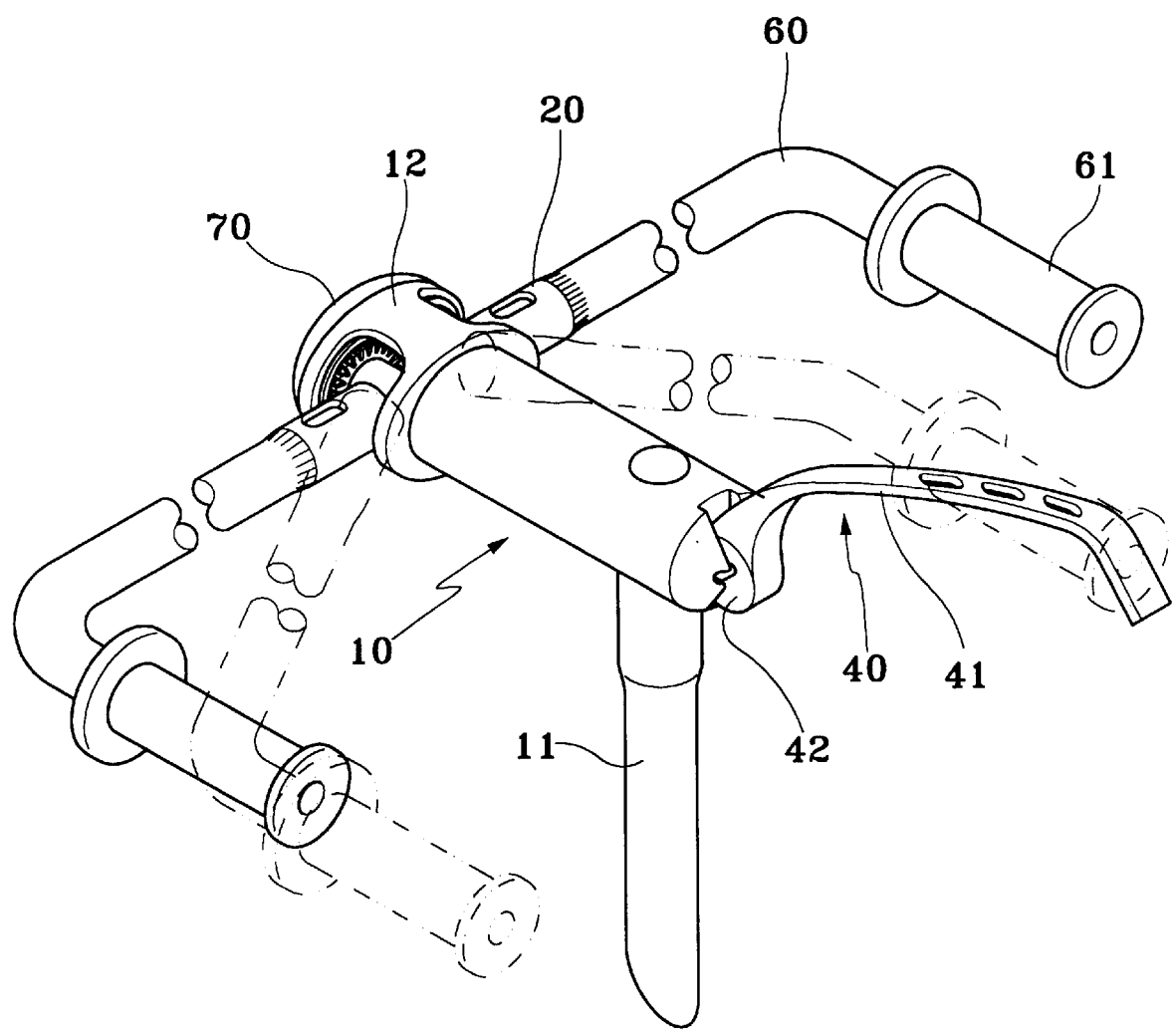

FIGS. 3A and 3B are sectional views for explaining an operation of the present invention, and FIGS. 4A and 4B are perspective views showing a locking status and a release one in an embodiment according to the present invention. The operational process of the present invention will be described with reference to FIGS. 3 and 4.

FIGS. 3B and 4B show the locking status of the handle assembly is released by pulling up the lever 40. The pull-up lever 40 is in a condition that the eccentric hole 43 of the cam 42 is moved from "a" to "b". That is, when the axle part 32 is moved by pulling up the lever 40, the tightening bar 30 is moved linearly along the guide holes 16, and then advances by a movement distance of the axle part 32.

As the tightening bar 30 moves backwards, the movable cover 50 jointed with the helical portion 31 is separated from one gear 23 of the head 22, and at the same time is separated from the other gear 24 engaged with the tooth 14.

Both bosses 20 under the pressure condition that rotation of the gears 23 and 24 is stopped by engaging the pressure tooth 51 of the movable cover 50 and the fixed tooth 14 with the gears 23 and 24, are released by the movement of the tightening bar 30, and then are positioned in a engagement state that the gears 23 and 24 face each together.

When the left and right handlebars 60 are pulled up and down by a necessary angle centering on the engaged gears 23 and 24, the gears 23 and 24 allow the left and right handlebars 60 to be simultaneously position-adjusted by an angle corresponding to rotation of the teeth thereof.

After adjusting the angle of the handlebars 60, the tightening bar 30 is tightened by pulling down the lever 40, as shown in FIGS. 3A and 4A, and thus the angle of the handlebar 60 is temporarily fixed.

The operational state of the lever 40, as shown in FIG. 3A, is that the eccentric hole 43 of the cam 42 is moved from "b" to "a". That is, when the axle part 32 is moved by pulling up the lever 40, the tightening bar 30 linearly moves along the guide holes 16 of the operational cam area 15, and then moves backwards by a moving trace of the axle part 32.

By the backward movement of the tightening bar 30, the movable cover 50 connected to the front of the helical portion 31 is incorporated to the gear 23, and at the same time the other gear 24 is associated with the fixed tooth 14 inside the receiving portion 13.

Figure 5:
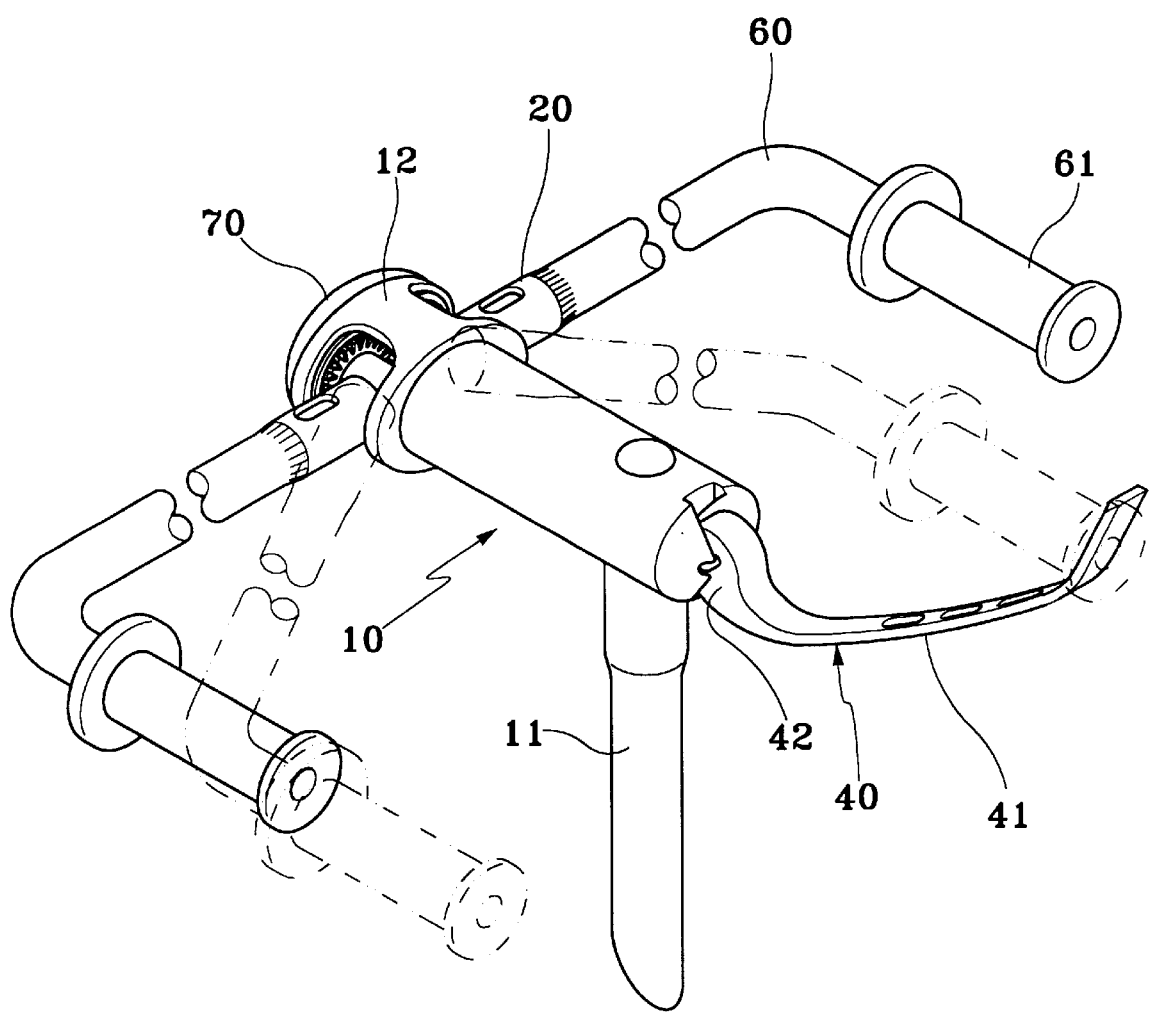
FIG. 5 is a perspective view of an angle-adjustable bicycle handle assembly according to another embodiment of the present invention.

Accordingly, the left and right bosses 20 engaged with each other are in a temporary stop condition that the gears 23 and 24 are engaged with each other. As shown in FIG. 5, the present invention can permit the lever 40 to be manipulated in a reverse direction, which has a reverse operation to that of the lever 40.

As described above, the present invention allows a tightening bar to be tightened or released by easy manipulation of a lever having a curved surface, and then allows a movable tooth and a fixed tooth to be engaged with the gears of the bosses, thereby to provide an effect of simplifying the locking and release operation of the bosses.

Particularly, when inserting a cam into a cam hole in order to extend a linear movement length in the conventional structure, it can be solved problems such as the limitation of the cam hole in size and a defective in attachment and detachment caused when locking the gears, to thereby obtain an effect that the gears are firmly engaged with each other. However, when locking or releasing the gears, the conventional structure has a position change of the bosses due to only engagement between tooth portions, while the present invention provides an effect of solving the conventional problem since no change of position of the tooth portions in the bosses is made due to locking and releasing operations. Furthermore, the present invention adopts a predetermined cover structure which covers the tightening bar and the movable cover and causes the cam of the lever to be also movably supported at the rear end of the casing. Accordingly, the present invention provides a stabilized assembly structure for adjusting an angle and an improved appearance, compared with the conventional apparatus.

While only certain embodiments of the invention have been specifically described herein, it will be apparent that numerous modifications may be made thereto without departing from the spirit and scope of the invention.

What is claimed is:

1. An angle-adjustable bicycle handle assembly comprising:

a lever including a cam to which tightening bars are eccentrically connected;

a casing comprising an opened operational cam area formed at a rear end of said casing, guide holes formed at opposite insides of said operational cam area through which the tightening bars are guided, a hollow cylindrical body disposed at a front end of said casing, and a receiving portion formed at a front end of said hollow cylindrical body, said receiving portion having a three-sided opening with an open front end and two open sides, said casing allowing said lever to be eccentrically rotated at an entrance of said guide holes in the operational cam areas;

two bosses oppositely disposed in said two open sides of said three-sided opening, each of said bosses having a protruding tooth gear formed at both a first end and second end thereof; and a removable cover having a fixed pressure gear for providing fixed engagement with one of said protruding tooth gears of each of said bosses when said cam is in a locked position, said removable cover disposed at said open front end of said three-sided opening;

a fixed receiving gear, formed at the inside of said receiving portion, for providing fixed engagement with one of said protruding tooth gears of each of said bosses when said cam is in a locked position.

2. The angle-adjustable bicycle handle assembly of claim 1, wherein each of said tightening bars is L-shaped and has a long leg portion and a short leg portion.

3. The angle-adjustable bicycle handle assembly of claim 2, wherein said short leg portion is connected to said cam and said long portion is longitudinally disposed through said housing.

4. The angle-adjustable bicycle handle assembly of claim 3, wherein said fixed receiving gear is adapted to allow said long leg portions of said tightening bars to be secured to said fixed receiving gear.

5. The angle-adjustable bicycle handle assembly of claim 4 wherein said removable cover has openings formed therein allowing access for securing said long leg portions to said fixed receiving gear.

6. The angle-adjustable bicycle handle assembly of claim 1, wherein said casing further comprises a steering shaft connection for connecting said assembly to a steering shaft.

7. The angle-adjustable bicycle handle assembly of claim 1, wherein said removable cover and said fixed receiving gear are adapted to receive a means for securing said removable cover to said fixed receiving gear.

8. The angle-adjustable bicycle handle assembly of claim 1, wherein said casing further comprises a plurality of tubular orifices disposed at an inside rear face of said housing, said plurality of tubular orifices being in communication with said guide holes for receiving said tightening bars.

9. The angle-adjustable bicycle handle assembly of claim 1, wherein said fixed pressure gear is figure 8-shaped.

10. The angle-adjustable bicycle handle assembly of claim 1, wherein said fixed receiving gear is figure 8-shaped.

11. The angle-adjustable bicycle handle assembly of claim 1, wherein said fixed pressure gear and one of said protruding tooth gears of each of said bosses become disengaged when said cam is moved to a release position.

12. The angle-adjustable bicycle handle assembly of claim 1, wherein said bosses are disposed adjacent to one another such that said protruding tooth gears engage one another for coupling movement of said bosses.

13. The angle-adjustable bicycle handle assembly of claim 1, wherein said cam operational area forms a vertically disposed slot whose width is sufficient for moving said lever up and down for providing improved lateral stability to said lever.

14. The angle-adjustable bicycle handle assembly of claim 1, wherein said lever has a first end and a second end, said cam is disposed at said first end and said second end is curved.

\* \* \* \* \*